United States Patent
Zipprich et al.

(10) Patent No.: US 7,349,118 B2
(45) Date of Patent: Mar. 25, 2008

(54) CONFIRMATION OF SECURE DATA FILE ERASURE

(75) Inventors: Andrew J. Zipprich, Rochester, NY (US); Bruce E. Talbert, Webster, NY (US); Keith G. Bunker, Hilton, NY (US)

(73) Assignee: Xerox Corp., Norwalk, CT (US)

( * ) Notice: Subject to any disclaimer, the term of this patent is extended or adjusted under 35 U.S.C. 154(b) by 1021 days.

(21) Appl. No.: 10/042,429

(22) Filed: Oct. 19, 2001

(65) Prior Publication Data

US 2003/0079078 A1   Apr. 24, 2003

(51) Int. Cl.
G06F 15/00 (2006.01)
(52) U.S. Cl. .................... 358/1.16; 358/1.15; 707/101; 711/163; 713/193
(58) Field of Classification Search .............. 358/1.15, 358/1.16; 707/101; 713/193; 711/163
See application file for complete search history.

(56) References Cited

U.S. PATENT DOCUMENTS

| | | | |
|---|---|---|---|
| 5,265,159 A * | 11/1993 | Kung .................... 713/193 |
| 5,623,540 A * | 4/1997 | Morrison et al. ...... 379/112.01 |
| 5,918,207 A * | 6/1999 | McGovern et al. ............ 705/1 |
| 6,061,149 A * | 5/2000 | Hosokawa et al. ......... 358/442 |
| 6,070,174 A * | 5/2000 | Starek et al. ............... 707/206 |
| 6,078,924 A * | 6/2000 | Ainsbury et al. ........... 707/101 |
| 6,122,446 A * | 9/2000 | Satoh ......................... 396/52 |
| 6,385,589 B1 * | 5/2002 | Trusheim et al. .............. 705/2 |
| 2001/0025343 A1 * | 9/2001 | Chrisop et al. ............. 713/193 |

* cited by examiner

*Primary Examiner*—Twyler Lamb
*Assistant Examiner*—Mark R. Milia
(74) *Attorney, Agent, or Firm*—Fay Sharpe LLP (57) ABSTRACT

A process that provides a status report following a request for the destruction of data files a user wishes to completely erase from a storage medium, such as a hard drive or removable disk. A system administrator can select a quantity of and pattern to be used in overwrites of the data file so that no one can recover the data from the storage medium. In embodiments, a graphical user interface (GUI) can be provided to allow user triggering of and parameter setting for the process. The GUI can be implemented at a device in which the storage medium is a component or can be implemented in a device driver GUI on a personal computer in communication with the device.

28 Claims, 10 Drawing Sheets

CONFIRMATION OF SECURE DATA FILE ERASURE

CROSS-REFERENCE TO RELATED APPLICATIONS

The subject matter of this patent application relates to U.S. patent application Ser. No. 09/871,877, SECURE DATA FILE ERASURE, filed on Jun. 4, 2001, which application is assigned to the assignee of this application, the disclosure of which is hereby incorporated by reference.

BACKGROUND AND SUMMARY

The invention relates to secure erasure of sensitive or private data from storage media and recording the disposition of a command to initiate such secure erasure.

Many photocopiers, printers, multifunction devices, and other reproduction and printing devices now include non-volatile memory (NVM), such as magnetic and optical storage media and including removable disk systems, hard drives, and other storage media systems allowing the device and/or a user to store a job the device uses or is directed to use the stored job. In high security areas (e.g., military installations), there is often a requirement that all jobs that stored on NVM of a device shall be inaccessible once the job is completed. Additionally, users in lower security area often wish to erase data they would like to keep private or confidential for various reasons.

The currently prevalent method of deleting a file is to delete the pointers and/or directory information that allows the device to locate the data; the document images/data files themselves are still resident in the NVM. This method usually does not meet the requirement that the job data shall be erased from the NVM once the job is complete. Current workarounds include: (1) removal of the NVM from the device and locked up at night, or (2) prohibiting NVM installation in the first place.

Lately, secure erase systems that overwrite the data with patterns of 1s, 0s, or random combinations thereof have come into use to meet erasure requirements. However, government agencies and other customers have different requirements as to how many times one can overwrite the appropriate portions of NVM once a job or task is completed, which can lead to difficulties in product design and implementation.

Embodiments allow a user or a system administrator (SA) to program a device to overwrite an entire NVM device or the particular region of NVM in which the data file associated with a print, scan, fax, copy, or other job resides. In embodiments, the data file is overwritten more than once, such as from 2 to about 50 times, with the exact number of overwrites being determined according to a stored default value or a user-input value. Further, in embodiments, the data file is overwritten with a different pattern on each overwrite according to a stored default value or a user-input value. For example, if a user has just printed something stored on a floppy disk, the user can erase it securely with a sequence of patterns of choice. Instead of trying to settle on a single algorithm (e.g., overwrite 3 times, first time with 1s, the second time with 0s, the third time with a random pattern), this allows overwriting "n" times with a set of patterns that can be downloaded to the device. Further, embodiments can implement Department of Defense approved overwrite routines.

The device, medium, and process of the present invention can have, in various embodiments, for example, three parameters:

1. A set of patterns with which the portion of the hard drive that is to be erased will be overwritten. This could be a table of patterns that will be used to overwrite the disk. In embodiments, the table of patterns can be generated in a manner allowing a customer/SA to preprogram the patterns so that the patterns are in a sequence that satisfies an installation's particular security requirements. In pseudo code, this looks like:

PatternTable (N)←Pattern1, Pattern2, Pattern3, . . . PatternN;

2. A site settable value that allows the customer/SA to program how many patterns with which to overwrite the portion of the hard drive that should be overwritten. The site settable value can be, for example, between 1 and about N (N is the number of patterns in PatternTable). In various embodiments, for example, NumPatternToUse is this site settable value.

3. A site settable value that allows the customer/SA to program how many times the entire set of patterns should be run. It can have any positive value. In various embodiments, NumberOfTimesToCycle can be this value.

The algorithm then uses, in various embodiments, the patterns and the number of overwrites to overwrite the portion of the disk N times. An example of a routine that can be used in embodiments of the invention employing a value like NumberOfTimesToCycle is the pseudocode expression:

For count←1 to NumPatternToUse Do

Overwrite region of storage media that stored the data file with PatternTable(count);

This allows for a flexible, programmable sequence of overwrites that should satisfy any overwrite requirement by any customer. Embodiments using a value like NumberOfTimesToCycle can use a routine such as, for example, that expressed by the pseudocode expression:

For NumberOfOverwriteCycle←1 to NumberOfTimesToCycle Do

For count←1 to NumPatternToUse Do

Overwrite region of storage media that stored the data file with PatternTable(count);

Embodiments of the invention employ a user interface (UI) or client activated erase trigger to automatically place the digital copier or printer into, for example, an Image Disk Erasing Routine, where an Image Disk is a storage media used by the device to store data files including scanned images of documents and/or print job data and the like. An example of such an Erasing Routine is a routine that executes three complete erasures with a check to ensure the data is completely erased; per industry or security approved processes. The Erasing Routine removes or destroys any residual data files including documents, images, and the like, on the Image or ESS Disks. In embodiments, a customer selectable UI/client button with confirmation that the process was completed could activate this routine. During this erasing feature, the system would be offline.

Thus, a feature of the invention to provide a storage medium security erase system comprising an erase trigger that tells a drive sector analyzer to retrieve data file location information from a CPU and send the location information to a secure storage medium eraser that overwrites the data file according to a predetermined secure erase method, the eraser using a type of overwrite pattern and a number of overwrites determined by an erase pattern determiner according to predetermined criteria and/or user input.

An additional feature in embodiments is to apply a method of securely erasing a data file by a providing an erase trigger, determining a location of the data file on the storage medium, overwriting the data file according to a predetermined secure erase method, and determining at least a number of times to overwrite the data file in response to the erase trigger and according to predetermined criteria.

Additionally, in embodiments, upon completion of an overwrite, a report is generated indicating the status of the overwrite. The report can be of various types and can be sent to various locations depending on the particular arrangement and desire of the user and/or administrator. Such a report can provide immediate feedback and logging/tracking of the overwrite events.

DETAILED DESCRIPTION

With reference to the accompanying FIGS., various embodiments of the invention include a device 1, such as a scanner, printer, photocopier, or other device, having a non-volatile memory (NVM) 2, such as a magnetic or optical storage medium, to which the device 1 can store data 3 and/or from which the device can read data 3 stored in a data file 4. In embodiments, the device 1 can use the data 3 to produce output, such as paper hard copy of a word processing document or the like. While the NVM 2 shown in the FIGS. is a removable magnetic storage medium, it must be understood that embodiments can apply to any NVM, such as hard disk drives, MO drives/media, CD-RW, DVD-RAM, tape drives, flash ROM, etc.

Various embodiments of the invention use a CPU 5 of the device 1 in which elements of the invention reside and that provides and executes various processes of the invention. For example, the CPU 5 can provide or respond to an erase trigger 6. The erase trigger 6 in embodiments of the invention can be a physical button on the device, a virtual button on, for example, an LCD of the device, or an instruction sent to the device as part of the data file 4 used to generate output from client software, such as a driver interface 7 on a remote computer. The CPU 5 stores the data file 4 in the NVM 2, which can be a fixed or removable storage medium, and keeps track of the data file 4 so that, when the erase trigger 6 is set, the erasure process can determine a location 8 of the data file on the NVM 2. The erasure process then overwrites the data file 4 according to a predetermined secure erase method; in embodiments of the invention, the secure erase method can include overwriting the data file 4 a particular number of times 9, using a particular pattern 10 to overwrite the data file 4 (such as all 1s, all 0s, etc.), and/or cycling the overwrite pattern on each iteration of the overwrite process 11. Other iteration and pattern variations can also be used. For example, the particular number of times 9 could be at least 3, cycling from a first pattern, to the complement of the first pattern, then to a second pattern, etc. Such a sequence has been approved for purging overwrites of sensitive data on NVM 2 employed, for example, by the Department of Defense.

To determine at least a number of times to overwrite the data file 4, the erasure process can check or respond to, for example, the erase trigger 6, which can include this information. Alternatively, in embodiments where the invention is implemented in a photocopier or the like, the user can be prompted to enter the number of times 9 and/or pattern(s) 10 to use to overwrite the data file 4. In embodiments in which the erase trigger 6 is provided from a driver interface 7, the user can provide the number of times 9 and/or pattern(s) 10 to use to overwrite the data file 4 when creating the job in the first place. Other user interfaces could also be employed, such as a web- or markup-language-based interface usable over a network and other interfaces, to provide the erase trigger 6 and the various parameters a user might be allowed to enter.

Figure 1:
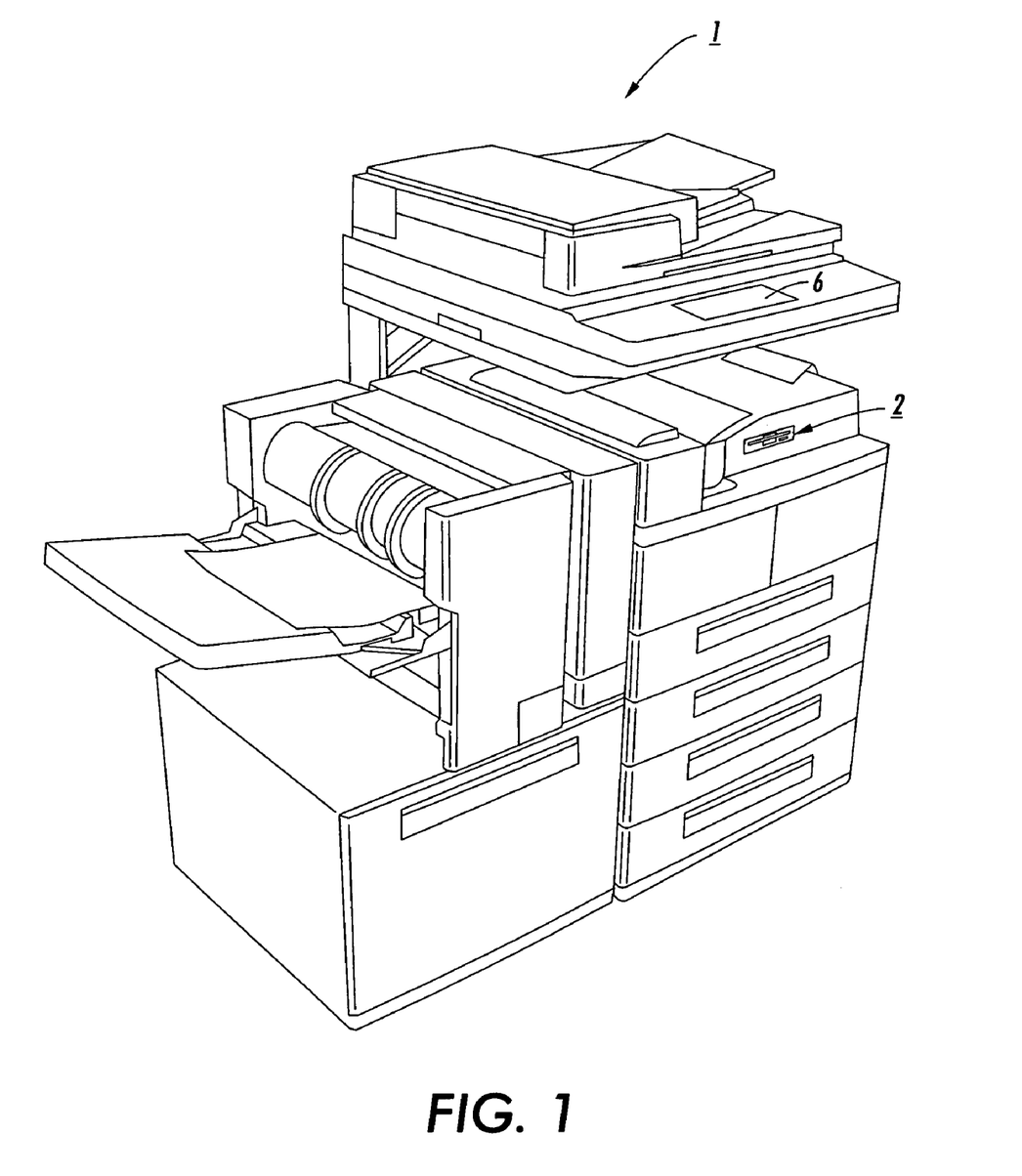
FIG. 1 is a perspective view of a digital printing and/or reproducing device that can use embodiments of the invention.
Figure 2:
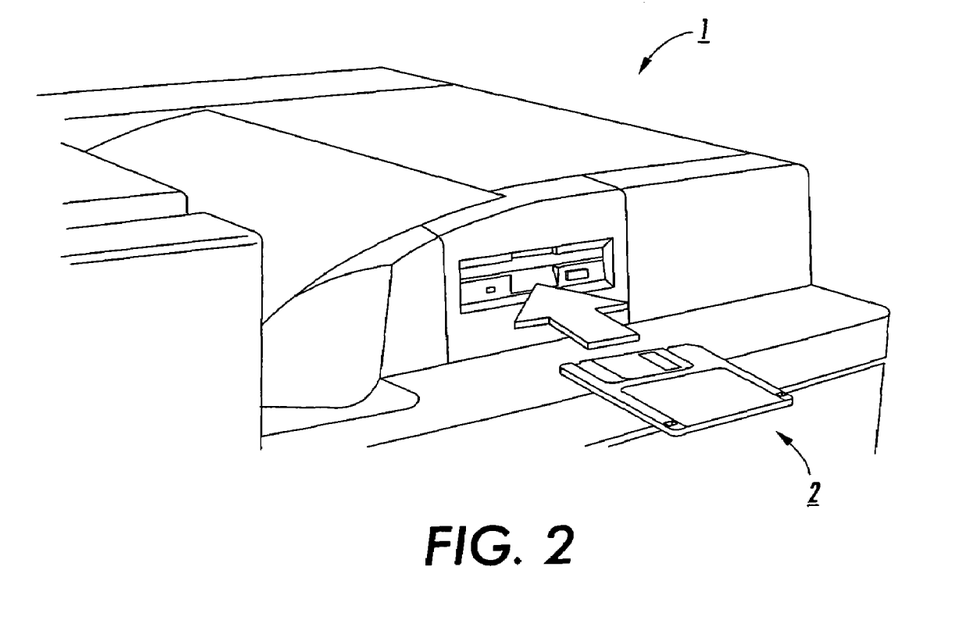
FIG. 2 is a close-up perspective view of a removable storage media drive of the device shown in FIG. 1.
Figure 3A:
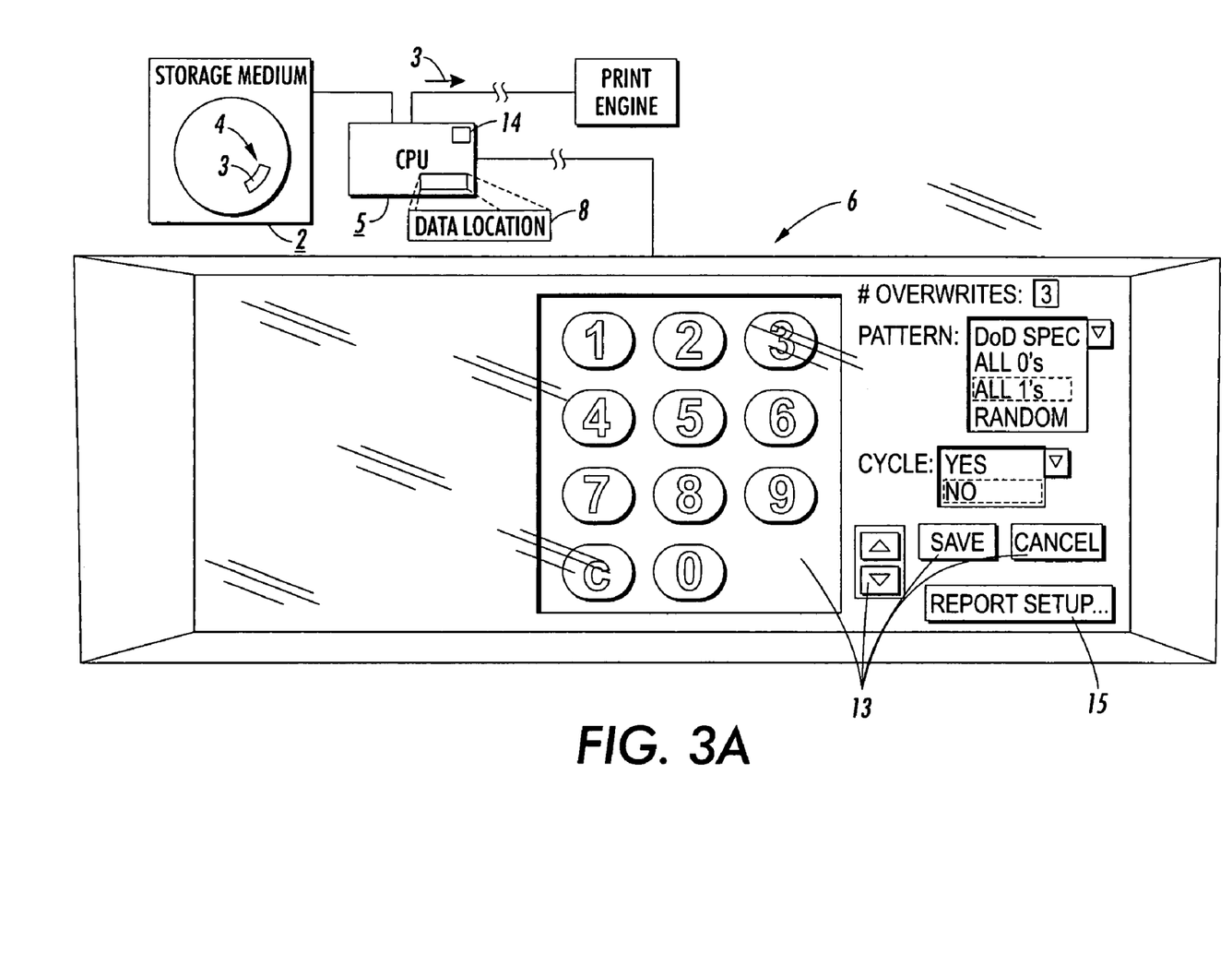
FIGS. 3A, 3B, and 3C are elevational views of a display panel of the device of FIG. 1 showing a graphical user interface in which a user can select parameters of embodiments of the invention.
Figure 3B:
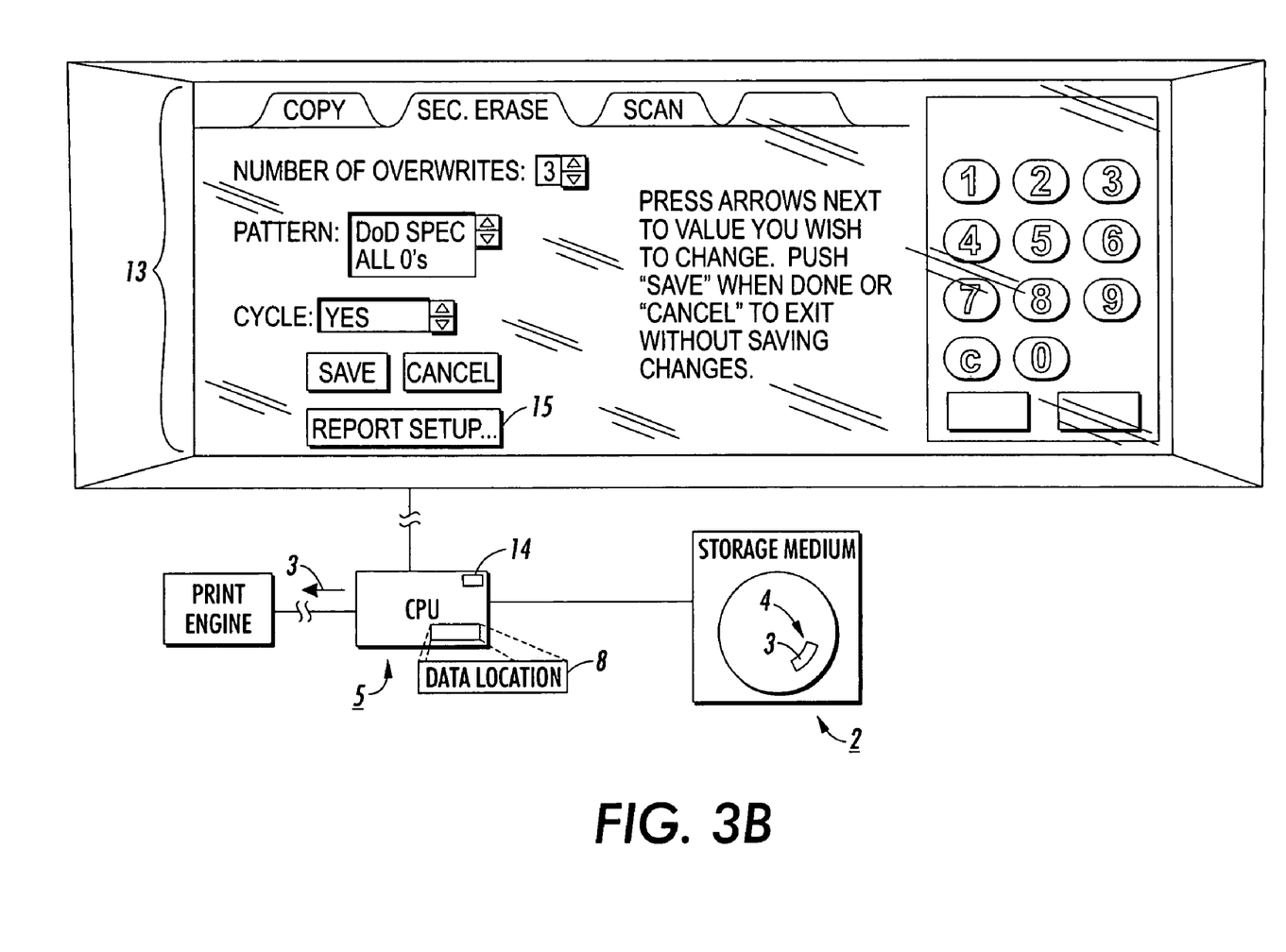

In embodiments allowing user selection of the various parameters, the CPU 5 can provide one or more graphical user interface (GUI) element(s) 13 in communication with or acting as the erase trigger 6. The CPU 5 can accept the user-selected parameter(s) from the GUI element(s) 13 with which to overwrite the data file. For example, the GUI element can be a virtual button or keypad displayed on a pressure-sensitive display of the device, such as that shown in FIGS. 3A and 3B. In embodiments, the GUI element(s) 13 can be part of a driver interface similar to that shown in FIG. 4.

In addition to user-selectable criteria, embodiments of the invention can allow a system administrator (SA) to program the device 1 to overwrite the data file 4 according to predetermined criteria, such as a stored number of overwrites 9 and/or sequence of patterns 10 of choice. Rather than trying to settle on a single algorithm (e.g., overwrite 3 times, first time with 1s, the second time with 0s, the third time with a random pattern) for all customers, this allows selection by the SA during setup or reconfiguration of the device 1. Further, embodiments of the invention can allow the SA to program a timer that will automatically delete all data files after a specified period has elapsed.

Where more than one pattern 10 is available, a set of patterns 12 can be stored in a storage medium 2 in communication with the system. The set of patterns 12 can be stored in a computer memory or another storage medium in, for example, a table, such as a table resembling the pseudocode expression:

PatternTable (N)←Pattern1, Pattern2, Pattern3, . . . PatternN.

The invention can then use the set of patterns 12, the number of times to overwrite 9, and a pattern selection variable to erase the data file 4 by overwriting. For example, in embodiments of the invention, the user-selected pattern NumPatternToUse to be used and a number of times N to overwrite the data file 4 according to the pseudocode expression:

For count←1 to NumPatternToUse Do

Figure 5:
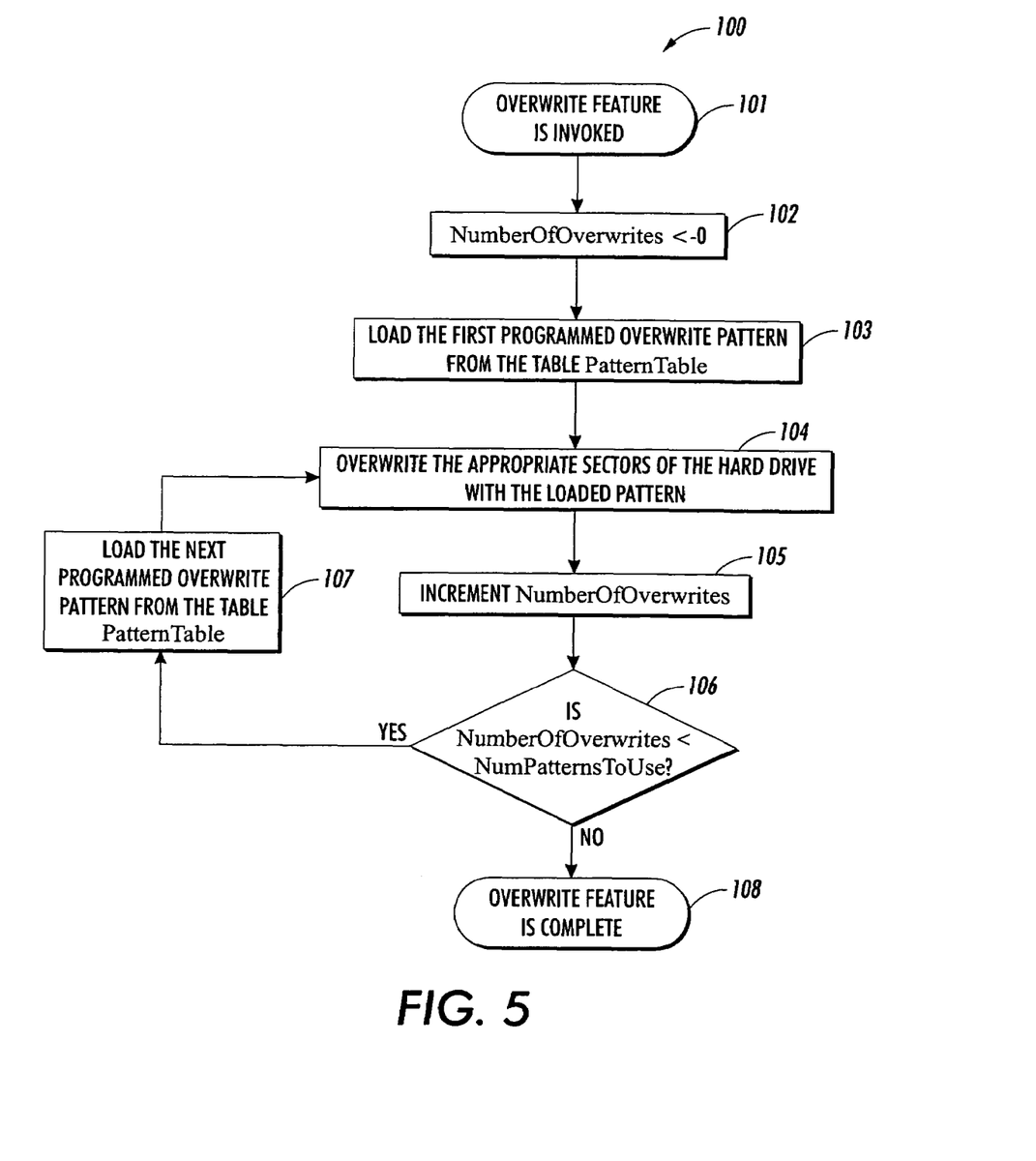
FIG. 5 is a schematic representation of process executed in embodiments.
Figure 6:
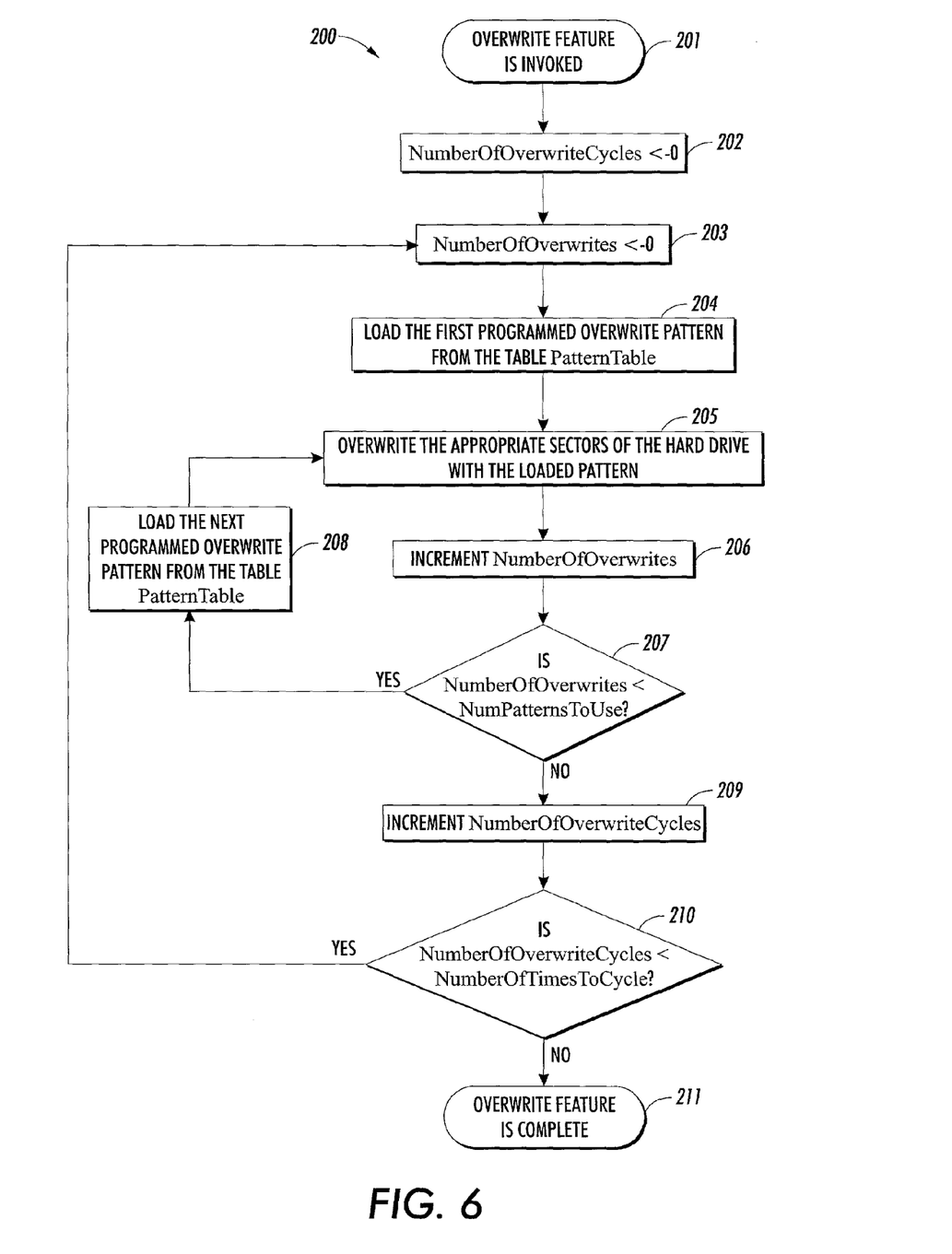
FIG. 6 is a schematic representation of another process executed in embodiments.

Overwrite region of storage media that stored the data file with PatternTable(count);

FIGS. 5 and 6 show two flow charts that show how embodiments of the invention might carry out the erasure process. Referring to FIG. 5, an embodiment of the process 11 using predetermined patterns from a pattern table, as well as a predetermined number of patterns to use (expressed by the variable NumPatternsToUse) is shown in flow chart 100. The erase trigger 6 is represented in the beginning block 101 of the flow chart 100 and an initial step is to set the counter NumberOfOverwrites to 0 as shown in block 102. Next, the first overwrite pattern is loaded from the pattern table, as seen in block 103. The data file 4 is overwritten using the loaded pattern as illustrated in block 104, and the NumberOfOverwrites is incremented as seen in block 105. The counter is compared to the number of patterns to use as shown in block 106. If the counter value is less than the number of patterns to use, then the next pattern is loaded as seen in block 107, and the steps shown in blocks 104-107 continue to be executed until the counter value is no longer less than the number of patterns to use, at which point the overwrite is complete, as expressed in block 108.

Referring to FIG. 6, an embodiment of the invention 11 using predetermined patterns from a pattern table, as well as a predetermined number of patterns to use (expressed by the variable NumPatternsToUse) is shown in flow chart 200 with the added feature of a number of overwrite cycles to be completed. The erase trigger 6 is represented in the beginning block 201 of the flow chart 200 and an initial step is to set the counter NumberOfOverwriteCycles to 0 as shown in block 202, then to set the counter NumberOfOverwrites to 0 as shown in block 203. Next, the first overwrite pattern is loaded from the pattern table, as seen in block 204. The data file 4 is overwritten using the loaded pattern as illustrated in block 205, and the NumberOfOverwrites is incremented as seen in block 206. The counter NumberOfOverwrites is compared to the number of patterns to use as shown in block 207. If the counter value is less than the number of patterns to use, then the next pattern is loaded as seen in block 208, and the steps shown in blocks 205-208 continue to be executed until the counter NumberOfOverwrites has a value that is no longer less than the number of patterns to use, at which point the particular overwrite is complete and the counter NumberOfOverwriteCycles incremented, as expressed in block 209. As shown in block 210, the value of the counter NumberOfOverwriteCycles is compared to a predetermined NumberOfTimesToCycle. If this counter value is less than the number of times to cycle, then the counter NumberOfOverwrites is reset, and the steps shown in blocks 203-210 continue to be executed until the counter NumberOfTimesToCycle has a value that is no longer less than the number of times to cycle, at which point the particular overwrite is complete as seen in block 211.

Figure 3C:
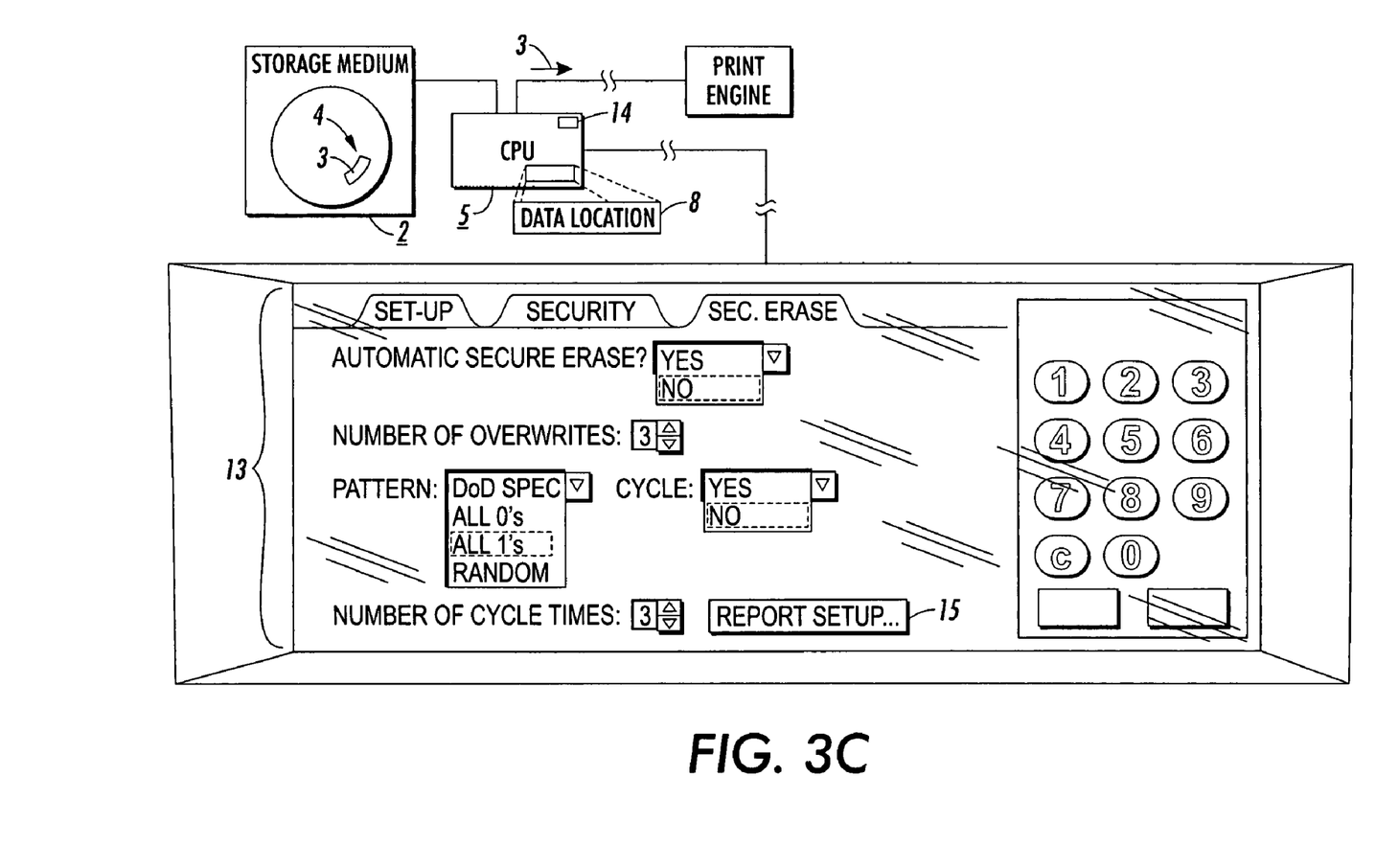
Figure 4:
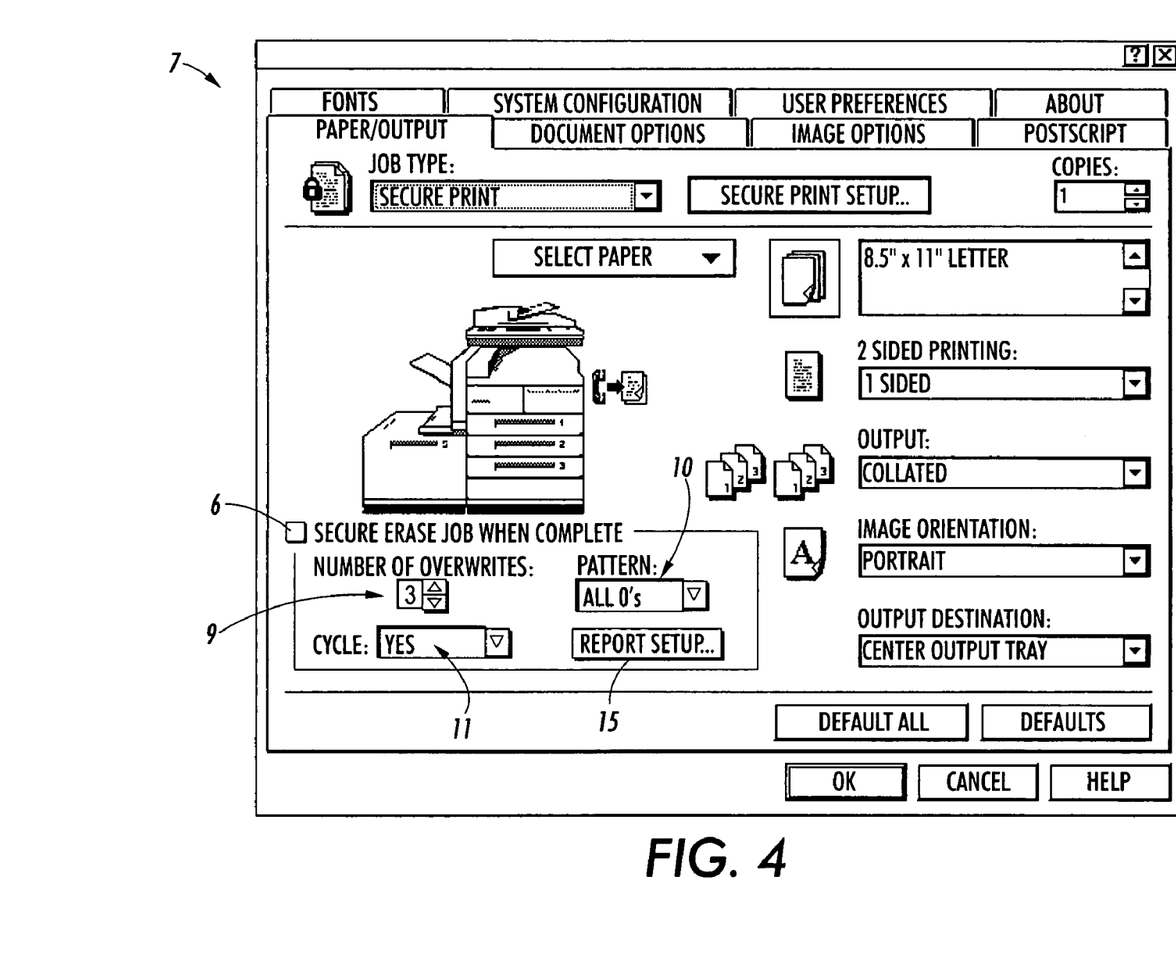
FIG. 4 is a schematic of a graphical user interface dialog box of a driver that can be implemented on a personal computer to control the device shown in FIG. 1, the dialog box allowing selection of parameters of embodiments of the invention.

As should be readily apparent to one of ordinary skill in the art, the preprogrammed values of NumberOfOverwrites and NumberOfTimesToCycle, as well as the preselected patterns, of the particular processes shown in FIGS. 5 and 6 could be user selected values entered into the system using apparatus and methods such as those shown in FIGS. 3 and 4, among others.

As an additional tool, embodiments can include a report generator 14, as seen in FIGS. 3A-C and 4, that can generate a report as to the disposition of an initiated overwrite. Any device including NVM 2 from which files are deleted according to embodiments could create such a report. Additionally, the report can be generated upon completion of a specific activity related to that stored file, such as job printed, file transferred to network, and fax sent. In embodiments, for example, upon completion of a hard drive overwrite, a report in the form of a print job is generated by the device indicating the status of the hard drive overwrite. The print job would print the report on a substrate to create a status sheet that can indicate success or failure to provide users immediate feedback and logging/tracking of the overwrite event.

Figure 7:
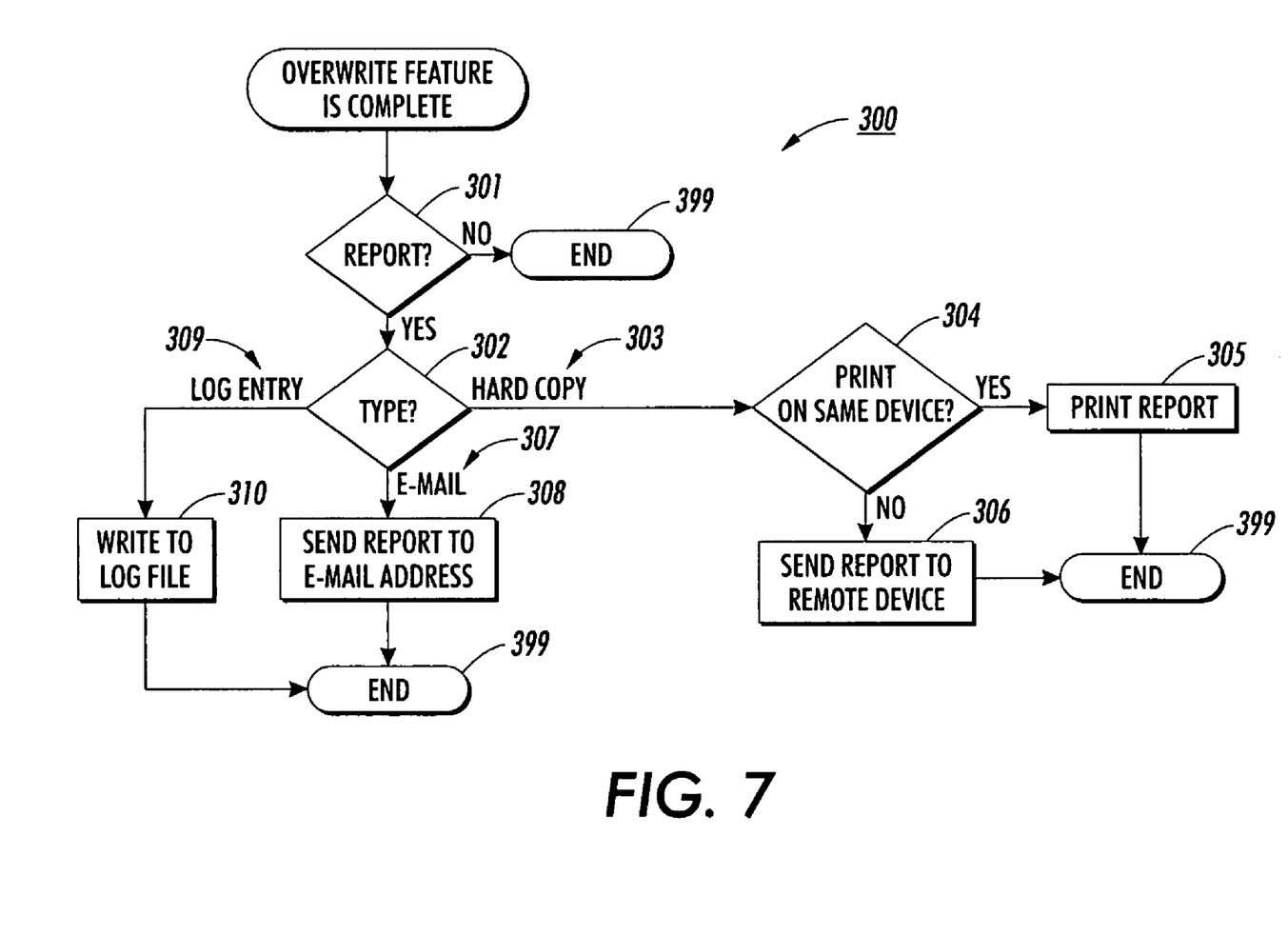
FIG. 7 is a schematic representation of the generation of a confirmation according to embodiments.

With particular reference to FIG. 7, showing an exemplary process 300 of embodiments, once a hard drive overwrite is completed, the device checks to see whether a report is to be generated (block 301). If not, then the process terminates (block 399), but if a report is to be generated, the device checks to see what type of report is to be generated (block 302). If the report is to be hard copy (block 303), then the device checks to see where the report should be printed (block 304). In situations in which the report should be printed on the same device as that which houses the NVM 2 that was overwritten, then the device prints the report (block 305). If the report is to be printed on another device, then the device sends a print job containing the report to the desired remote device (block 306), such as an administrator's dedicated printer, and the process terminates (block 399).

Where the report is to be an e-mail message (block 307), the device sends a message to an e-mail address (block 308) and the process terminates (block 399). In embodiments, the e-mail address can be an administrator's e-mail address, a user's address, or some other e-mail address specified by the administrator or the user, and might or might not be alterable by the user.

When the report is to be an entry in a log file (block 309), the device writes the entry in the log file (block 310) and the process terminates (block 399). The log file can, in embodiments, specified by an administrator or by a user, and might or might not be alterable by a user, depending on the particular nature of the installation. Further, rather than an entry added to an existing file, the device could create a standalone log file; in other words, the log entry would be made in a new file created by the device in a specified location.

With reference to FIGS. 3A, 3B, 3C, 4, and 8, the user interface of the device can include a GUI element 15 allowing access to a report setup interface 400. In embodiments, the report setup interface 400 will be displayed on the device itself, while in other embodiments, the report setup interface 400 will be displayed in a driver interface 7. In either case, embodiments could enable an administrator to restrict access to the report setup interface 400 so that only the administrator could make changes.

Figure 8:
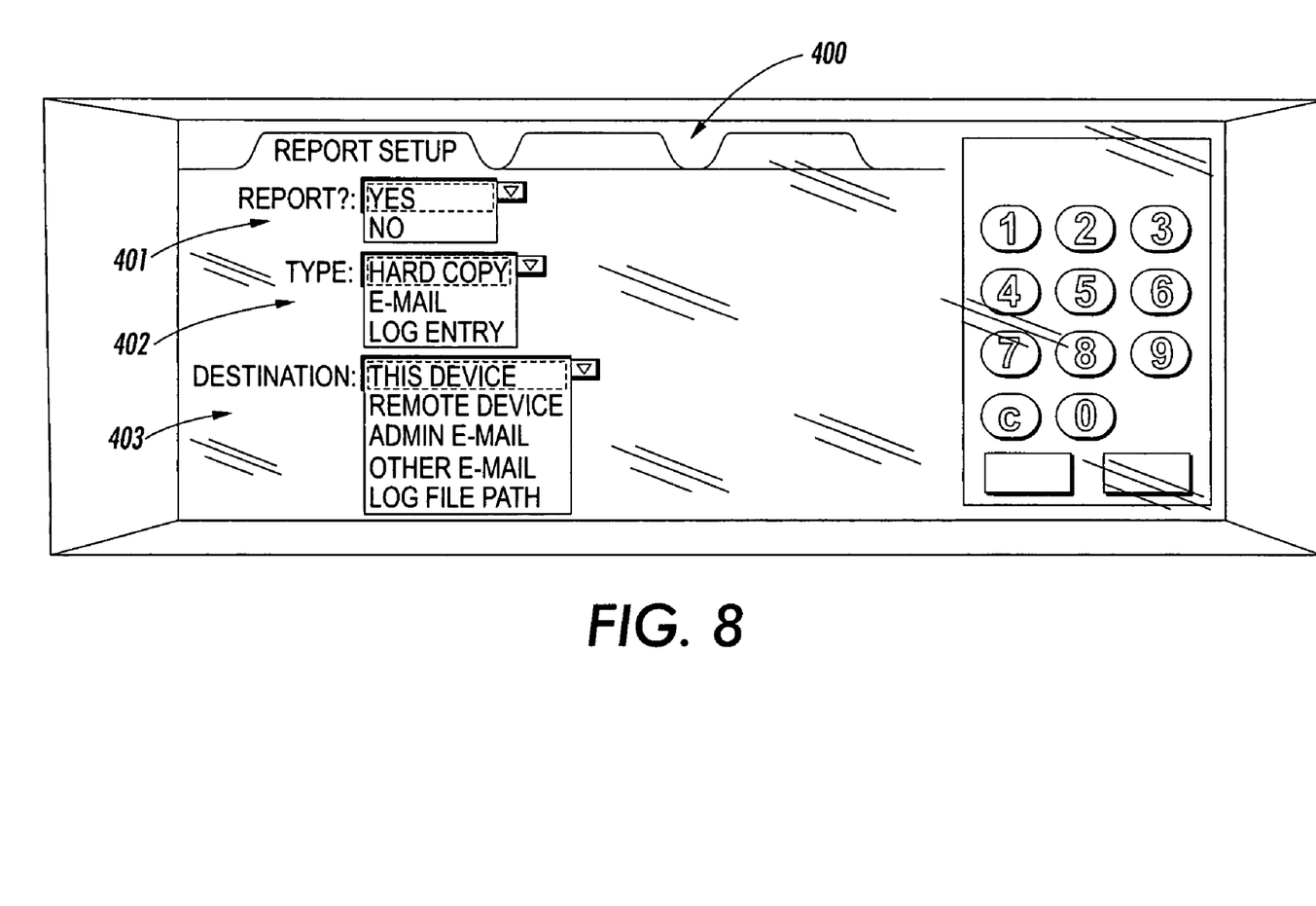
FIG. 8 is a schematic representation of a GUI that could be used in embodiments.

The report setup interface 400 can include, in embodiments, a report GUI element 401 determinative of the generation of a report. For example, the report GUI element 401 could include a pulldown menu, a check box, a radio button, etc., that allows a user or administrator to indicate that a report should be generated when an overwrite has completed.

Additionally, the report setup interface 400 can include, in embodiments, a type GUI element 402 indicating what type of report the device should generate. For example, the type GUI element 402 could be a pulldown menu, a set of radio buttons, a set of check boxes, etc., including a list of the types of reports available for selection and allowing a user or administrator to indicate what type of report the device should generate.

Further, the report setup interface 400 can include, in embodiments, a destination GUI element 403 indicating where the report should go. As with the report and type GUI elements 401, 402, the destination GUI element 403 can be a pulldown menu, one or more check boxes, one or more radio buttons, or one or more other suitable GUI elements 13 allowing a user or administrator to indicate a destination for the report. The destination GUI element 403 can vary depending upon the type of report indicated by type GUI element 402. For example, where a hard copy report is indicated, such as by type GUI element 402, the destination GUI element 403 might be a pulldown menu including a list of devices available for printing the report.

Where an e-mail message is indicated in type GUI element 402, the destination GUI element 403 could be a pulldown menu including a list of e-mail addresses to which the report can be sent, or it could be a text entry field into which the user or administrator can enter an e-mail address. The destination GUI element 403 could even, in embodiments, become a text entry field could even be created were the user or administrator to select a list item labeled "New Address" or the like.

Where a log entry is indicated in type GUI element 402, the destination GUI element 403 could be a pulldown menu including a list of log files to which the report can be written, or it could be a text entry field into which the user or administrator can enter new log file path. The destination GUI element 403 could even, in embodiments, become a text entry field could even be created were the user or administrator to select a list item labeled "New Path" or the like. Further, the destination GUI element 403 could include a selection indicating that the log entry should be made in a new file each time and allow a user or administrator to indicate a destination NVM 2 to which the files should be written.

Of course, other types of reports could be generated. For example, distinctive sounds could be made indicating success, failure, and other results of the overwrite process. Additionally, a speech synthesis routine could be employed to inform a designated individual of the results of the overwrite process.

Thus, in installations where customers wish to ensure data security, such as high security areas like military installations, customers can meet the requirement that all printed/copied jobs stored on hard drive(s) or other storage media of such devices be inaccessible once the job has completed without removing the storage medium. In addition, many customers simply want to ensure the privacy of their information and wish to erase print and/or copy jobs from storage media on which the jobs might be stored. The current conventional method of deleting a file (deleting the pointers to the data) can still be done, but the method according to embodiments of the invention ensures that data files themselves no longer reside on the disk and can not be recovered.

Other modifications of the present invention may occur to those skilled in the art subsequent to a review of the present application, and these modifications, including equivalents thereof, are intended to be included within the scope of the present invention.

What is claimed is:

1. A device comprising:
   a storage medium supported in a housing;
   a user-input value that links to in a unique set of patterns that when used to overwrite a data file meets an approved standard;
   an erase trigger that effectuates overwrites of data files on the storage medium, where each said overwrite comprises said unique set of patterns to each said data file and is periodically activated at a discrete point in time prior to the initiation of said overwrite, subsequent to the user entering the parameters for said overwrite, the number and order of said patterns varies according to said user-input value identified for each of said data file;
   a secure storage medium eraser comprising an overwrite algorithm that erases the data file on the storage medium in response to the erase trigger; and
   a report generator that can create a report on a status of a triggered erasure in response to predetermined criteria.

2. The device of claim 1 wherein the report created by the report generator is printed on a substrate.

3. The device of claim 2 wherein the report is printed by a printing device in which the storage medium being erased is housed.

4. The device of claim 2 wherein the report is printed by a printing device in communication with the secure storage medium eraser.

5. The device of claim 1 wherein the report created by the report generator is an e-mail message.

6. The device of claim 5 wherein the e-mail message is sent to a system administrator.

7. The device of claim 5 wherein the email message is sent to the user setting the erase trigger.

8. The device of claim 1 wherein the report is a sound.

9. The device of claim 1 wherein the report generator is configurable by an administrator only.

10. The device of claim 1 wherein the predetermined criteria include at least one of an indication of whether a report should be created, a type of report to be generated, and a destination of the report.

11. The device of claim 1 wherein the predetermined criteria can be set via a report setup interface.

12. A device comprising:
    a storage medium supported in a housing;
    a user-input value that links to a unique set of patterns that when used to overwrite a data file meets an approved standard;
    a stored pattern table containing a plurality of patterns that can be accessed according to an overwrite algorithm;
    an erase trigger periodically executed at a discrete point in time prior to the initiation of said overwrite, subsequent to the user entering the parameters for said overwrite, that effectuates an overwrite of a data file on the storage medium, wherein said overwrite comprises said unique set of patterns selected from said stored pattern table that is unique to said data file and is activated according to a user-input value identified for said data file;
    a secure storage medium eraser comprising said overwrite algorithm that erases the data file on the storage medium in response to the erase trigger;
    a report generator that creates a report on a status of a triggered erasure in response to predetermined criteria; and
    a report setup interface through which the predetermined criteria can be set.

13. The device of claim 12 further including at least one graphical user interface (GUI) element of the report setup interface with which a user can set parameters of the predetermined criteria with which the report generator can create a report.

14. The device of claim 13 wherein the at least one GUI element includes a button.

15. The device of claim 13 wherein the at least one GUI element includes a virtual keyboard with which a user enters a value of a parameter.

16. The device of claim 12 wherein the report setup interface includes a report element indicative of whether a report should be created.

17. The device of claim 12 wherein the report setup interface includes a type element indicative of what type of report should be created.

18. The device of claim 12 wherein the report setup interface includes a destination element indicative of where the report should be sent.

19. The device of claim 12 wherein the report setup interface is accessible by an administrator only.

20. The device of claim 12 further including an input apparatus and wherein the report setup interface is accessed via the input apparatus.

21. The device of claim 12 wherein the report setup interface is accessed via driver software on a computer in communication with the device.

22. A selective secure erase report generation method comprising:
    overwriting a data file with a set of patterns chosen from a stored pattern table that is unique to said data file according to a predetermined secure erase method in response to an erase trigger periodically activated at a discrete point in time prior to the initiation of said overwrite, subsequent to the user entering the parameters for said overwrite, by user-input value identified for said data file;
    checking that said file has been erased according to a predetermined industry standard in response to a confirmation trigger;
    determining whether a report should be generated; and
    generating a report of the status of a triggered erasure when the report should be generated.

23. The method of claim 22 further comprising determining a type of report to be generated.

24. The method of claim 22 further comprising determining a destination for the report.

25. An apparatus including:
    a storage medium supported in a housing;
    a user-input value that links to a unique set patterns that when used to overwrite a data file meets an approved standard;
    an erase trigger that effectuates an overwrite of a data file on the storage medium, where said overwrite is periodically activated at a discrete point in time prior to the initiation of said overwrite, subsequent to the user entering the parameters for said overwrite, and comprises using said unique set of patterns selected from a pattern table used to overwrite said data file and is activated according to said user-input value identified for said data file;
    a secure storage medium eraser comprising an overwrite algorithm that erases a the data file on the storage medium in response to the erase trigger;
    a report generator that creates a report on a status of a triggered erasure in response to predetermined criteria including at least one of an indication that a report is to be generated, a type of report to generate, and a destination for the report; and
    a report setup interface through which the predetermined criteria can be set;
    the apparatus performing a selective secure erase report generation method comprising:
    checking to see whether a report is to be generated;
    when a report is to be generated:
        checking a type of report to generate;
        checking a destination for the report; and
        generating the report at the destination.

26. The apparatus of claim 25 wherein the report is to be printed on a substrate, the apparatus further performing:
    checking where the report should be printed;
    printing the report at the apparatus if the apparatus is the destination; and
    printing the report on another device when another device is the destination.

27. The apparatus of claim 25 wherein the report is to be an e-mail message, the apparatus further performing sending an e-mail message to an e-mail address specified via the report setup interface.

28. The apparatus of claim 25 wherein the report is to be a log entry and the apparatus further performs writing the entry in a log file specified via the report setup interface.

* * * * *

UNITED STATES PATENT AND TRADEMARK OFFICE
CERTIFICATE OF CORRECTION

PATENT NO.        : 7,349,118 B2                                    Page 1 of 1
APPLICATION NO. : 10/042429
DATED             : March 25, 2008
INVENTOR(S)       : Andrew J. Zipprich, Bruce E. Talbert and Keith G. Bunker It is certified that error appears in the above-identified patent and that said Letters Patent is hereby corrected as shown below:

On the Title Page, Item (73) should read --(73) Assignee: Xerox Corporation, Norwalk, CT (US)--.

Signed and Sealed this

Nineteenth Day of August, 2008

JON W. DUDAS
*Director of the United States Patent and Trademark Office*